Figure 1:
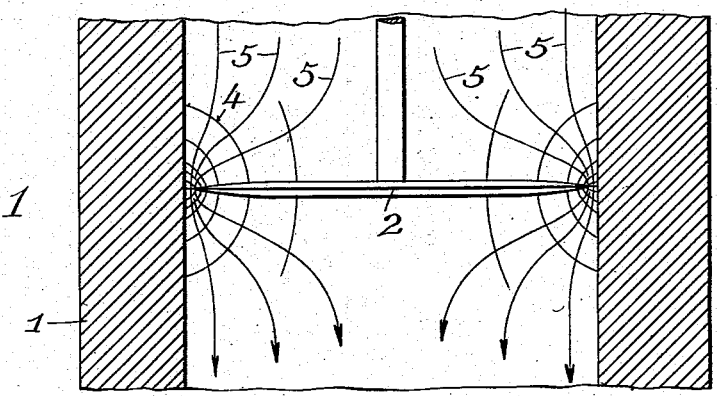

Dec. 4, 1923.  1,475,995
L. HEIS ET AL
CHEMICAL CONVERSION OF SUBSTANCES
Filed March 21, 1923    2 Sheets-Sheet 1

Inventors:
Leonhard Heis
Hubert Jegler
By _____ Atty.

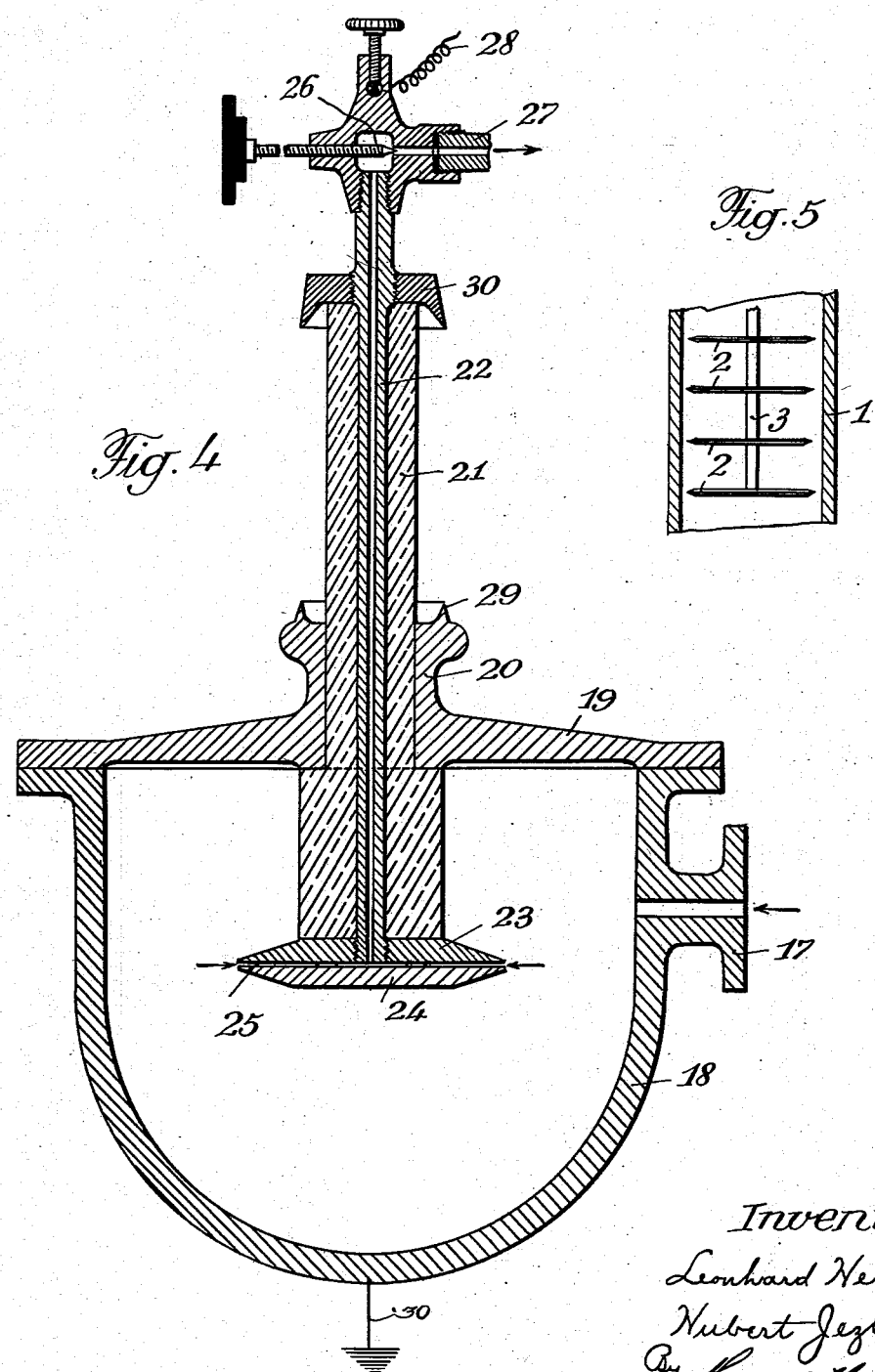

Patented Dec. 4, 1923.

1,475,995

UNITED STATES PATENT OFFICE.

LEONHARD HEIS AND HUBERT JEZLER, OF ZURICH, SWITZERLAND.

CHEMICAL CONVERSION OF SUBSTANCES.

Application filed March 21, 1923. Serial No. 626,658.

*To all whom it may concern:*

Be it known that we, LEONHARD HEIS, a citizen of the Republic of Germany, residing at Zurich, Switzerland, and HUBERT JEZLER, a citizen of the Republic of Switzerland, residing at Zurich, Switzerland, have invented certain new and useful Improvements in the Chemical Conversion of Substances; and we do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

Numerous apparatus exist already intended for the chemical conversion of especially gaseous and vaporous substances by means of an electric discharge. Generally the substances to be converted i. e., chemical actions to be produced are, between the electrodes of such apparatus, subjected to the action of an electric current in the form of an electric arc, sparks, brush-light, glow-light and cold discharges, the chemical conversion being effected by shock ionization. In order to cause the required electric energy to act on a great many molecules it is necessary with these processes to cause the substances to travel a long stretch between the electrodes. The practical application of these processes yields, however, insufficient results in most cases.

In contradistinction to the hitherto known processes with the process according to the present invention the substances to be converted are caused to pass through very intense electric fields without producing the disruptive or discharge phenomena above described, and having an intensity of at least $10^5$–$10^8$ volt per centimetre which fields are obtained by the utilization of high tension currents or by the combined utilization of such currents and of steam or gas pressures up to thousands of atmospheres, whereby the temperature of the substances is variable within wide limits.

The intense electric fields may further be produced at the intensely curved surface of electric conductors, such as for instance points, edges, or thin wires, by charging these conductors with high tension current. With such fields and for the conversion of some substances pressures of for instance 20, 100 and more atmospheres may be found sufficient.

Most of the modern physicists favour the view that the binding forces within the atoms and the molecules are of an electric nature. It must therefore be possible to effect dissociations when electric forces are utilized which are sufficiently powerful. There are numerous indications to be found in the modern technical literature about the order of magnitude of these forces.

When working at atmospheric pressure the generation of the necessary electrostatic intensity of field can be frustrated by the fact, that with comparatively small intensities of field shock ionization is initiated by the action of the ions which are always present to a certain degree, this shock ionization may prevent a further considerable increase in the intensity of field. The intensity of field at which the shock ionization starts depends on the pressure of the gas and is in proportion to said pressure. This intensity of field is with air under atmospheric pressure approximately $2$–$5.10^4$ volt/cm. On the other hand the intensity of field which is necessary for the direct cessation of the molecular binding forces is independent of the density of the gas and amounts, for instance to $10^8$ volt/cm. with nitrogen. In order to attain this intensity of field it may be found necessary to work at such pneumatic pressures that the shock ionization only occurs when this intensity of the field is reached. The pneumatic pressure required for treating air and nitrogen amounts to approximately $10^2$ atmospheres. Experiments have borne out this conclusion and have shown that with an increasing pneumatic pressure a continuously increasing quantity of the gas is rendered active and that at a determined pressure, i. e., at the pressure at which the shock ionization is approximately completely suppressed, the highest output of active gas is obtained.

The largest electrostatic forces are present in the immediate neighbourhood of the surface of intensively curved conductors which are charged with electricity, for instance at points, along edges and around thin wires. By suitably shaping the surface of the conductor as well as by choosing the tension, the intensity of these fields may be altered at will. The height of the tension is limited or controlled in practice by a suitable increase of the curvature of the surface, however, the fields may be so chosen that their action overcomes wholly or partially the chemical binding forces. If the fields can be made sufficiently intense, a very small space is obtained within which nearly all the molecules can be influenced. Only this small space shall be utilized according to the present invention.

Assuming as conductor a thin wire or one provided with a sharp edge and using the tension $\varphi$ as ordinates and the distance $s$ as abscissæ then the intensity of fields is—

$$\frac{d\varphi}{ds}.$$

If such conductors are charged for instance with a current of approximately 500,000 volt or more, electric fields are generated in the immediate neighbourhood of these conductors showing an intensity of $10^8$ volt/cm. and more, which intensity suffices to overcome many chemical binding forces. As the intensity of the field decreases very rapidly with an increase in the distance from the conductor it is evident that the effective space is very small and measures only a few millimetres or perhaps only fractions of a millimetre. Within this limited field the substance forced through it is acted upon only a very short time, as this small space is quickly transversed by the substance to be treated. The converted substances are thereupon not subjected to a further destruction in the weak field but they may act on each other unobstructedly. When the substance flows past edges, the whirls generated thereby may be utilized for mixing the separated components.

The shock ionization which acts in the same manner is not desired as it causes a good conductivity and thereby the formation of sparks, of glow- and brush-light and of cold discharges with the result of a temporary reduction in the intensity of the field whereby the uniformity of effective action and the desired result are reduced to a large extent.

The shock ionization may be prevented for the greatest part by forcing the substances to be treated—gases, vapors and dust suspensions and their mixtures, and hereinafter called gaseous substances—through a small passage, in which the field is most intense, at a suitable speed and eventually at a proper pressure, or by admixing to the medium to be treated, substances which lower effectively the electric conductivity but which do not necessarily partake in the chemical conversion. A further way of keeping the shock ionization within certain limits consists in the utilization of the electrical condensing action by the expansion of vaporous media in the electric field.

The progress of the chemical conversion of the substances will approach the ideal state when for instance a circular disc having a sharp edge is continuously charged at high tension and is so mounted that near the disc no other body is present having a different potential and through which the electric current would flow off. Under this condition and making use of the above mentioned precautions for avoiding the shock ionization the conversion of the supplied electric energy into the equivalent chemical energy takes place continuously whereby the escape of free electricity from the field which would be a loss, is avoided.

In practice, however, this ideal state is only approximately attained, but the approximation goes so far that high concentrations of the converted substances are obtained without too great losses occurring.

Constructional examples of devices adapted to carry into effect the present process are illustrated in the accompanying drawings, in which Figs. 1–5 are vertical sections through five devices.

Referring to Fig. 1 of the drawings, 1 denotes a tubular insulator in which a circular disc 2 having a knife edge is located, the disc 2 being charged at high tension by means of a vertical rod 3. The cross-sectional area of the passage between the nonconductor 1 and the disc 2 is dimensioned of a greater or smaller width according to the required action of the electric field. But in any case this width must be small to obtain the greatest pressure of the gas at the constricted passage between the knife edge and the tube wall where the intense field is located. The electric field which is at the periphery of the disc 2 and the maximum intensity of which is in the immediate neighbourhood of the knife edge of the disc, is illustrated by the lines of force 4. The substances to be converted, which may be in a vaporous, gaseous and powdery state, i. e. suspended as dust, or in a mixture of these states, are forced to pass through the electric field in the direction of the arrows 5 at more or less high speeds and under high pressures.

Figure 2:
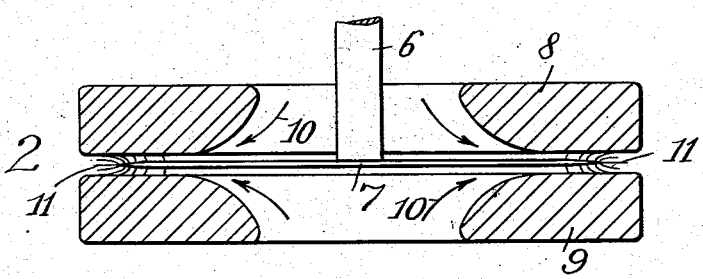

Fig. 2 illustrates a constructional form of the device which is a modification of that shown in Fig. 1. The knife edged plate 2 shown in Fig. 1 is replaced by a thin sheet metal disc 7 which is charged at high tension by the conductor 6.

The conductive disc 7 is arranged in a small space between two parallel discs 8 and 9 made of insulating material, which space corresponds to the effective portion of a field. The substance to be converted is forced in the direction of the arrows 10 through the high tension field 11 present at the edge of the disc 7. The direction of flow of the substance may also be reversed if circumstances require it.

Figure 3:
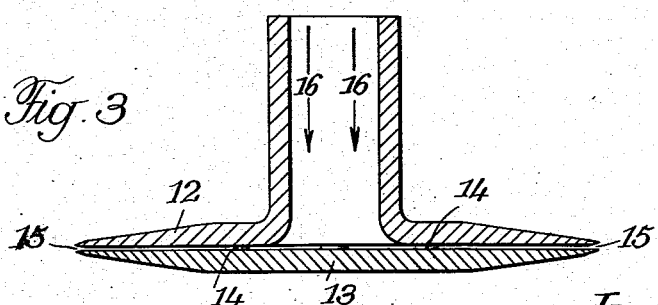

Fig. 3 shows a further constructional example of a device according to the invention which differs from the above described two examples inasmuch as two knife edged conductive discs 12 and 13 charged with electric current are utilized. The two discs are electrically connected to each other by means of intermediate pieces 14 or spacing blocks so that a very narrow space is obtained between the discs. The field is formed at the edges of the discs, at 15, and gases which are forced in the direction of the arrows 16 through the tubular extension of the disc 12 have to pass through this field.

Fig. 4 shows the whole arrangement of an apparatus for the chemical conversion of substances. The substance to be treated is supplied to the apparatus which is of metal through the branch 17 of a receptacle 18. The receptacle is closed by a cover 19 having a cylindrical extension 20 through which an insulated member 21 passes. The member 21 surrounds a tube 22 made of conductive material. The lower end of the tube 22 is screwed to a conductive disc 23 to which a disc 24 is fixed, a narrow space 25 being left between the discs for the substance to flow through. At the other end of the tube 22 a valve 26 is arranged by means of which the pressure inside the receptacle 18 can be regulated. The treated substances are discharged at 27. The top of the tube 22 is connected to a source of high tension current, for instance to a transformer by the lead 28, the receptacle 18 is grounded at 30. The top of the extension 20 is provided with a sharp edged flange 29 and above the insulated member 21 there is arranged a metallic cap 30 having a similar sharp edged flange, the flanges forming between them a safety sparking gap.

The two knife edged discs may be substituted by two discs made of thin sheet metal, or more than two discs may be used, (for instance four as shown in Fig. 5) to suit special practical requirements.

With the last described arrangement very small areas for the passage of the substance are obtained without the utilization of nonconductive protecting discs 8 and 9, as shown in Fig. 2.

It is evident that a great many constructional forms of the devices according to the invention can be made and that instead of discs other bodies made of wires such as wire nettings, spirals, sharp points and the like may be used for generating the fields through which the substances to be treated have to pass.

In Figs. 1-3 only the field producing elements of the device are illustrated, numbers of such elements may of course be assembled to form an apparatus as required in practice, and as is shown in Fig. 5.

The present invention is of particular importance for the production of nitrogenous compounds from the air whereby air is forced through the devices described above and the nitrogen molecules are dissociated, i. e. are rendered active; however, the invention may be applied to any other substances in vaporous or gaseous condition or suspended as dust.

The substances to be treated may be forced through the fields at varying initial and final pressures and at varying speeds for which more or less narrow areas for the substances to pass may be chosen according to the effective portion of the field. The substances may also be forced from nozzles as free jets through the electric fields.

With some chemical products it is advantageous to let the converted substances mix with each other only after they have passed the electric fields.

The treatment of the substances may also take place at high temperatures, in this case the most suitable temperatures at which the conversions may be effected will have to be carried out by experiments in every case.

We claim:

1. The process of effecting chemical action of substances that are in a gaseous or vaporous state or in suspension, which comprises forcing the substances to be treated through a high tension electrical field without causing shock ionization and rupture of said field.

2. The process of effecting chemical action of substantially gaseous substances or suspensions, which comprises producing an electric field of not less than 10 volts per cm. and forcing the substance to be treated through such field without causing shock ionization and rupture of said field.

3. The process of effecting chemical action of substantially gaseous substances, which comprises producing a small electric field of a tension between $10^5$ and $10^8$ volts per cm., and forcing such substance through said small field under a pressure considerably above atmospheric pressure without producing shock ionization and a disruptive discharge of said field.

4. The process of effecting chemical action, which comprises forming at the acutely curved surface of an electric conductor a static electrical field of high tension, and passing the substances to be treated through such field at a pressure and temperature that will not cause shock ionization and a rupture of said field.

5. The process of effecting chemical action, which comprises generating a high tension electrical field, subjecting the substance to be treated to the action of such field without discharging the field to produce shock ionization, and maintaining a high pressure on the substance during its passage through the field.

6. The process of effecting chemical action, which comprises maintaining a high tension electrical field without producing shock ionization at an acutely bent conducting surface, and crowding the substance to be treated through a narrow space in such field at a high pressure without discharging said field.

7. The process of effecting chemical action, which comprises maintaining a high tension electrical field without producing shock ionization at an acutely bent conducting surface, and crowding the substance to be treated through a narrow space in such field at a high pressure and at a high temperature without rupture or discharge of said field.

8. The process of effecting chemical action, which comprises imparting a high pressure to the substance to be treated, maintaining at an acutely curved conducting surface a very intense electrical field without producing shock ionization, the electrical tension and curvature of said surface being chosen to maintain a field between $10^5$ and $10^8$ volts per cm., and maintaining the high pressure on the substance while in said field without causing rupture of said field.

9. The process of effecting chemical action of substantially gaseous substances, which comprises forcing such substance to be treated through a high tension electrical field without causing shock ionization or a rupture of said field, and mixing with such substance a medium capable of lowering the electric conductivity of said substance.

10. The process of effecting chemical action of substantially gaseous substances, which comprises forcing such substance through a high tension electric field without causing shock ionization or rupture of said field, mixing with such substance a medium capable of lowering the electric conductivity of the substance, and maintaining a high pressure on the mixture while in such high tension field.

11. The process of effecting chemical action of substantially gaseous substances, which comprises forcing such substances through a constricted passage in a high tension electrical field without causing shock ionization and thereby imparting whirls to such substances to mix the components of such substances, and controlling the initial and end pressures of the substance to determine the speed of passage through such field.

12. The process of effecting chemical action of substantially gaseous substances, which comprises imparting a high pressure to the substances to be treated, forcing the substances under said high pressure through very intense electric fields formed at the acutely curved surface of electric conductors, thereby causing the condensing action produced by the expansion of vaporous substances to reduce shock-ionization, and controlling the temperature of the substance to be treated.

13. The process of effecting chemical action of substantially gaseous substances, which comprises imparting a high pressure to the substances to be treated, forcing each substance separately under high pressure through very intense electric fields formed on the acutely curved surface of electric conductors without producing shock ionization, and causing the substances leaving said electric fields to mix and react with each other.

14. A device for effecting chemical action of substantially gaseous substances, comprising a plurality of elements each consisting of a conductor having an acutely curved surface, means to charge said elements with high tension current, and means to conduct the substances to be treated through the electric fields without producing shock ionization at the acutely curved surfaces of said elements.

15. A device for effecting chemical action of substantially gaseous substances, comprising a plurality of elements each consisting of a disc of conductive material provided with a knife-edged circumference, means to charge said elements with high tension current, and means to conduct the substances to be treated through the electric fields at the acutely curved surfaces of said elements, without producing shock ionization.

16. A device for effecting chemical action of substantially gaseous substances, comprising a plurality of elements, each consisting of a conductor having an acutely curved surface, means to charge said elements with high tension current, means to conduct the substances to be treated through the electric fields generated at the acutely curved surfaces of said elements, and means to limit the area for the passage of the substances to the most effective parts of the field without producing shock ionization.

17. A device for effecting chemical action, comprising an electrical conductor having an acutely curved surface, means to charge said conductor at high potential to form an electrical field of increased potential at the acutely curved surface without effecting shock ionization, and means to direct through such field in a constricted passage thereat the gaseous substance to be treated under substantially high pressure.

18. A device for effecting chemical action, comprising a closed chamber having an inlet for the material under pressure, an electrode comprising spaced electrode elements arranged to form a narrow slot between them, a tube extending from said electrode and slot, and means to supply current to the electrode to produce a substantially non-disruptive electrical field at the edges of the electrode and slot.

19. A device for effecting chemical action, comprising a closed, grounded chamber having an inlet for the material under pressure, an electrode comprising electrode elements arranged to form a narrow slot between them, a conductive tube passing into said chamber and perpendicular to said electrode and slot for the exit of products formed, a valve to control said tube, and an electric terminal for the tube.

In testimony that we claim the foregoing as our invention, we have signed our names.

LEONHARD HEIS.
HUBERT JEZLER.